3,501,769
1-ARYLOXY - 3 - SECONDARY-ALKYL AND ARALKYL-2-PROPANOLS AND THE SALTS THEREOF
Albert Frederick Crowther, Leslie Harold Smith, and Thomas Miller Wood, Macclesfield, England, assignors to Imperial Chemical Industries Limited, London, England, a corporation of Great Britain
No Drawing. Original application Nov. 26, 1963, Ser. No. 326,233. Divided and this application May 25, 1966, Ser. No. 566,170
Claims priority, application Great Britain, Dec. 11, 1962, 46,740/62; July 19, 1963, 28,717/63
Int. Cl. C07c *91/00, 91/04*
U.S. Cl. 260—501.17            10 Claims This application is a division of our copending application, Ser. No. 326,233, filed Nov. 26, 1963 and now abandoned.

This invention relates to new pharmaceutical compositions containing alkanolamine derivatives which possess β-adrenergic blocking activity and which are therefore useful in the treatment or prophylaxis of coronary artery disease.

Certain 1-amino-3-phenoxy-2-propanol derivatives, and certain phenylthio-analogues thereof, are known, but it was not known heretofore that compounds of this type possess β-adrenergic blocking activity.

According to the invention we provide pharmaceutical compositions comprising as active ingredient at least one alkanolamine derivative of the formula:

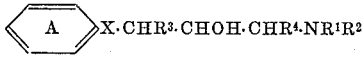

wherein $R^1$ stands for hydrogen, or an alkyl, alkenyl or aralkyl radical, any of which may optionally be substituted, wherein $R^2$ stands for hydrogen, or an alkyl, cycloalkyl, alkenyl or aralkyl radical, any of which may optionally be substituted, or wherein $R^1$ and $R^2$ are joined together with the adjacent nitrogen atom to form a heterocyclic radical, wherein $R^3$ and $R^4$, which may be the same or different, stand for hydrogen or alkyl radicals, wherein X stands for the oxygen or sulphur atom, and wherein the benzene ring (A) may optionally bear one or more additional substituents, and the esters thereof, and the salts thereof, together with a pharmaceutically-acceptable diluent or carrier.

It is to be understood that the above definition of alkanolamine derivatives encompasses all possible stereoisomers thereof, and mixtures thereof.

As a suitable value for $R^1$ when it stands for an alkyl radical there may be mentioned, for example, an alkyl radical of not more than 10 carbon atoms, for example the methyl, ethyl or isopropyl radical.

As a suitable value for $R^1$ when it stands for an alkenyl radical there may be mentioned, for example, an alkenyl radical of not more than 10 carbon atoms for example the allyl radical. As a suitable value for $R^1$ when it stands for an aralkyl radical there may be mentioned, for example, an aralkyl radical of not more than 10 carbon atoms, for example the benzyl radical.

As a suitable value for $R^2$ when it stands for an alkyl radical there may be mentioned, for example, an alkyl radical of not more than 20 carbon atoms, for example the ethyl, n-propyl, isopropyl, n-butyl, isobutyl, s-butyl, t-butyl or 1-methyloctyl radical. As a suitable value for $R^2$ when it stands for a substituted alkyl radical there may be mentioned, for example, an alkyl radical of not more than 20 carbon atoms bearing a hydroxy radical or an alkoxy radical, for example an alkoxy radical of not more than 5 carbon atoms, for example the methoxy or n-propoxy radical. As a suitable value for $R^2$ when it stands for an aralkyl radical, optionally substituted, there may be mentioned, for example, an aralkyl radical of not more than 15 carbon atoms, optionally substituted, for example optionally substituted with hydroxy, halogen or alkoxy radicals, for example alkoxy radicals of not more than 5 carbon atoms. Thus, specific values for $R^2$ when it stands for a substituted alkyl radical or for a substituted or unsubstituted aralkyl radical are the 2-hydroxy-1, 1-dimethylethyl, 2-n-propoxyethyl, benzyl, 1-methyl-3-phenylpropyl or 4-methoxybenzyl radical. As a suitable value for $R^2$ when it stands for a cycloalkyl radical there may be mentioned, for example, a cycloalkyl radical of not more than 10 carbon atoms, for example the cyclopentyl radical. As a suitable value for $R^2$ when it stands for an alkenyl radical there may be mentioned, for example, an alkenyl radical of not more than 10 carbon atoms, for example the allyl radical.

As a suitable value for the group —$NR^1R^2$ when it stands for a heterocyclic radical there may be mentioned, for example, a 5- or 6-membered nitrogen-containing heterocyclic radical.

As suitable values for $R^3$ and $R^4$ when they stand for alkyl radicals there may be mentioned, for example, alkyl radicals of not more than 5 carbon atoms, for example the methyl radical.

As suitable optional additional substituents on the benzene ring (A) there may be mentioned, for example, one or more substituents selected from halogen atoms, for example fluorine, chlorine, bromine or iodine atoms, and alkyl, alkoxy and alkythio radicals, for example alkyl, alkoxy or alkythio radicals of not more than 10 carbon atoms, for example the methyl, ethyl, isopropyl, t-butyl, t-amyl, methoxy, ethoxy, n-butoxy or methylthio radical, and acyl radicals, for example alkanoyl, aralkanoyl or aroyl radicals of not more than 10 carbon atoms, for example the acetyl or benzoyl radical, and the hydroxy radical, and halogenoalkyl radicals, for example halogenoalkyl radicals of not more than 5 carbon atoms, for example the trifluoromethyl radical, and aryl, aryloxy, alkylaryloxy, arylthio, arylsulphonyl, arylamino, aralkyl and aralkoxy radicals, for example aryl, aryloxy, alkylaryloxy, arylthio, arylsulphonyl, arylamino, aralkyl or aralkoxy radicals of not more than 10 carbon atoms, for example the phenyl, phenoxy, 4-tolyloxy, phenylthio, phenylsulphonyl, anilino, benzyl, α,α-dimethylbenzyl or benzyloxy radical, and the nitro group and alkenyl radicals.

Alkanolamine derivatives which may be used as active ingredients in the pharmaceutical compositions of the invention include, for example, the known compounds 1-(2-chlorophenoxy)- and 1-(2,6-dimethylphenoxy)-3-isopropylamino-2-propanol, and the new alkanolamine derivatives described in Examples 10–35 hereinafter. As particularly valuable compounds there may be mentioned, for example, the known compound 1-(2-chlorophenoxy)-3-isopropylamino-2-propanol and the new compounds 1-(3-tolyloxy)-, 1-(4-tolyloxy)-, 1-(2,3-dimethylphenoxy)-, 1-(2,4-dimethylphenoxy)-, 1-(3,4-dimethylphenoxy)-, 1-(3,5-dimethylphenoxy)-, 1-(3-ethyl-5-methylphenoxy)-, 1-

(3-chlorophenoxy)-, 1-(2,3-dichlorophenoxy)-, 1-(3,5-dichlorophenoxy)-, 1 - (2,4,5-trichlorophenoxy)-, 1 - (3-fluorophenoxy)-, 1-(4 - chloro-3-methylphenoxy)-, 1-(3-methoxyphenoxy)-, 1-(2-hydroxyphenoxy)-, 1-(3-nitrophenoxy)-, 1-(3-trifluoromethylphenoxy)-, 1-(2-phenylphenoxy)-, 1 - (2 - phenoxyphenoxy)-, 1 - (3-phenoxyphenoxy)-, 1-(2-benzoyl - 5 - methoxyphenoxy)-, 1-(4-anilinophenoxy)-, and 1-[2-(4-tolyloxy)phenoxy]-3-isopropylamino-2-propanol, and 1-(3,5-dimethylphenoxy)-3-(1-methyl-3-phenylpropylamino) - 2 - propanol, 1-(2,3-dichlorophenoxy) - 3 - s - butylamino-2-propanol, 1-(2-hydroxy-1,1-dimethylethylamino) - 3 - (3 - tolyloxy)-2-propanol and 1-t-butylamino-3-(3-tolyloxy)-2-propanol, and the salts thereof; and the preferred compounds of these are 1-(3-tolyloxy)-, 1-(3,5-dimethylphenoxy)-, 1-(3-chlorophenoxy)-, 1-(2,3-dichlorophenoxy)-, 1-(3,5-dichlorophenoxy)-, 1-(2-phenoxyphenoxy)- and 1-[2-(4-tolyloxy)phenoxy]-3-isopropylamino-2-propanol, and 1-(3,5-dimethylphenoxy)-3-(1 - methyl - 3 - phenylpropylamino)-2-propanol and 1-t-butylamino-3-(3-tolyloxy)-2-propanol, and the salts thereof.

As suitable alkanolamine esters there may be mentioned, for example, O-esters derived from a saturated or unsaturated aliphatic carboxylic acid, for example such an acid of not more than 20 carbon atoms, for example acetic, palmitic, stearic or oleic acid, or O-esters derived from an aromatic carboxylic acid, for example such an acid of not more than 15 carbon atoms, for example benzoic acid.

As suitable salts of the alkanolamines and alkanolamine esters which may be used as active ingredients in the pharmaceutical compositions of the invention there may be mentioned acid-addition salts, for example salts derived from inorganic acids, for example hydrochlorides, hydrobromides, phosphates or sulphates, or salts derived from organic acids, for example oxalates, lactates, tartrates, acetates, salicylates, citrates, benzoates, $\beta$-naphthoates, adipates or 1,1'-methylene-bis-(2-hydroxy-3-naphthoates), or salts derived from acidic synthetic resins, for example sulphonated polystyrene resins, for example "Zeo-Karb" 225 ("Zeo-Karb" is a trademark). Relatively insoluble salts, for example the 1,1'-methylene-bis-(2-hydroxy-3-naphthoates), have the advantage that they afford prolonged blood levels of the medicament.

The pharmaceutical compositions of the invention may be in the form of tablets, capsules, aqueous or oily solutions, aqueous or oily suspensions, emulsions, sterile injectable aqueous or oily solutions or suspension, or dispersible powders.

Suitable tablets may be formulated by admixture of the active ingredient(s) with known pharmaceutical excipients, for example inert diluents, for example calcium carbonate, calcium phosphate or lactose, disintegrating agents, for example maize starch or alginic acid, binding agents, for example starch, gelatin or acacia mucilage, and lubricating agents, for example magnesium stearate, acid or talc. Such tablets may optionally be coated by known techniques in order to delay disintegration in the stomach and thus to provide a sustained action over an extended period.

The aqueous suspensions, emulsions, oily solutions and suspensions of the invention generally contain a sweetening agent, for example glycerol, dextrose or sucrose, and a flavouring agent, for example vanillin or orange extract, in order to provide a palatable product. The aqueous suspensions of the invention may also contain suspending or thickening agents, for example sodium carboxymethylcellulose, wetting agents, for example condensation products of fatty alcohols with ethylene oxide, and preservatives, for example methyl or propyl p-hydroxybenzoate.

The emulsions of the invention may contain the active ingredient(s) dissolved in an oil of vegetable or animal origin, for example arachis oil or cod liver oil, and may also contain sweetening agents and flavouring agents which may with advantage be essential oils. The said emulsions may also contain emulsifying agents and dispersing agents, for example soya bean lecithin, polyoxyethylene sorbitan mono-oleate, gum acacia, gum tragacanth or casein, and preservatives, for example methyl or propyl p-hydroxybenzoate, and anti-oxidants, for example propyl gallate.

The oily solutions of the invention likewise contain the active ingredient(s) in solution in an oil of vegetable or animal origin and may optionally contain flavouring agents to mask the taste and improve oral acceptability. Such oily solutions may advantageously be filled into soft gelatin capsules. The oily solutions may also contain sweetening agents, for example icing sugar, in which case the oil phase may in addition contain a suspending agent, for example beeswax, to maintain the redispersion properties of the suspension.

Oral compositions in the form of gelatin capsules may consist of capsules containing active ingredient(s) only or the capsules may contain the active ingredient(s) in admixture with inert diluents, for example lactose or sorbitol.

The sterile injectable aqueous suspensions of the invention may contain a suspending or thickening agent, for example sodium carboxymethylcellulose, and a wetting or dispersing agent, for example a phenol-polyethylene oxide condensate, for example the condensation product of octylcresol with about 8–10 molecular proportions of ethylene oxide. The sterile injectable oily solutions of the invention may be prepared from a non-toxic injectable oil, for example arachis oil or ethyl oleate, and they may additionally contain gelling agents, for example aluminum stearate, to delay absorption within the body. These aqueous and oily injectable preparations may contain one or more preservatives, for example methyl or n-propyl p-hydroxybenzoate, or chlorobutanol.

Many of the active ingredients of the pharmaceutical compositions of this invention are new compounds. According to a further feature of the invention, therefore, we provide alkanolamine derivatives of the formula:

wherein Y stands for the oxygen atom, $R^5$, $R^7$ and $R^8$ stand for hydrogen, $R^6$ stands for the ethyl radical and the benzene radical (B) stands for the 4-chloro-3-methylphenyl or 3,5-dimethylphenyl radical, or $R^6$ stands for the n-propyl radical and the benzene radical (B) stands for the 3-tolyl, 3,5-dimethylphenyl, 2,5-dichlorophenyl or 3-methoxyphenyl radical, or wherein Y stands for the oxygen atom, $R^5$ stands for hydrogen or an alkyl radical, optionally substituted, or an alkenyl or aralkyl radical, $R^6$ stands for a branched-chain alkyl, substituted alkyl, cycloalkyl or alkenyl radical, or an aralkyl radical of more than 7 carbon atoms, optionally substituted, $R^7$ and $R^8$, which may be the same or different, stand for hydrogen or alkyl radicals, and the benzene ring (B) bears a substituent in the 3- or 4-position only, or it bears a substituent in the 2-position only which is a hydroxy, nitro or iodo substituent or an acyl, aryl, aryloxy, alkylaryloxy, arylthio, arylsulphonyl, arylamino, aralkyl or aralkoxy substituent, or it bears two, three, four or five substituents, or wherein Y stands for the sulphur atom, $R^5$ stands for hydrogen and $R^6$, $R^7$, $R^8$ and B have the same meanings as $R^2$, $R^3$, $R^4$ and A respectively, and the esters thereof, and the salts thereof, but excluding 1-(4-chlorophenoxy)-3 - (1 - methyl - 2 - phenylethylamino) - 2 - propanol, 1 - (2,6 - dimethylphenoxy) - 3 - isopropylamino - 2-propanol, 1 - (4 - t - amylphenoxy) - 3 - isobutylamino-2 - propanol, 1 - (4 - t - amylphenoxy) - 3 - isoamylamino - 2 - propanol, 1 - (4 - t - amylphenoxy) - 3 isopropylamino - 2 - propanol, 1 - (4 - t - butylphenoxy) - 3 - isoamylamino - 2 - propanol, 1 - (4 - chlorophenoxy) - 3-cyclohexylamino - 2 - propanol, 1 - (4 - chlorophenoxy)-3 - isoamylamino - 2 - propanol, 1 - isobutylamino - 3 - (2- methoxyphenoxy) - 2 - propanol and 1 - (N - isopropyl-N - methylamino) - 3 - (2 - methoxyphenoxy) - 2 - propanol, and the salts thereof.

It is to be understood that the above definition of new alkanolamine derivatives encompasses all possible stereoisomers thereof and mixtures thereof.

Suitable values for $R^5$, $R^6$, $R^7$, $R^8$ and B are those values of $R^1$, $R^2$, $R^3$, $R^4$ and A respectively which are mentioned above and which fall within the above definition of the alkanolamine derivatives of the invention. Similarly, suitable esters and salts are those mentioned above.

Particularly valuable new alkanolamine derivatives of the invention are those mentioned hereinbefore.

According to a further feature of the invention we provide a process for the manufacture of the alkanolamine derivatives of the invention which comprises the interaction of a halogeno compound of the formula:

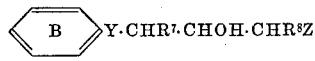

wherein Z stands for a halogen atom, and $R^7$, $R^8$, B and Y have the meanings stated above, with an amine of the formula $NHR^5R^6$, wherein $R^5$ and $R^6$ have the meanings stated above.

As a suitable value for Z there may be mentioned, for example, a chlorine or bromine atom. The interaction may conveniently be accelerated or completed by the application of heat, and it may be carried out in an inert diluent or solvent.

According to a further feature of the invention we provide a process for the manufacture of the alkanolamine derivatives of the invention which comprises the interaction of an epoxide of the formula:

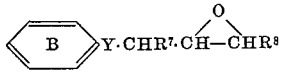

wherein $R^7$, $R^8$, B and Y have the meanings stated above, with an amine of the formula $NHR^5R^6$, wherein $R^5$ and $R^6$ have the meanings stated above.

The interaction involving an epoxide may conveniently be accelerated or completed by the application of heat, and it may be carried out in an inert diluent or solvent, for example ethanol.

According to a further feature of the invention we provide a process for the manufacture of the alkanolamine derivatives of the invention which comprises the interaction of a compound of the formula:

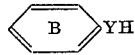

wherein B and Y have the meanings stated above, with a compound of the formula:

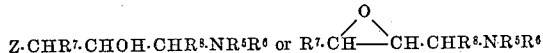

wherein $R^5$, $R^6$, $R^7$, $R^8$ and Z have the meanings stated above.

The last-named interaction may conveniently be carried out in the presence of an acid-binding agent. Alternatively, an alkali metal derivative of the phenol or thiophenol reactant, for example the sodium or potassium derivative, may be used as starting material.

According to a further feature of the invention we provide a process for the manufacture of the alkanolamine derivatives of the invention which comprises the hydrogenolysis of a compound of the formula:

wherein $R^6$, $R^7$, $R^8$, B and Y have the meanings stated above, $R^9$ stands for a hydrogenolysable radical and $R^{10}$ stands for the carbonyl radical (CO), the hydroxymethylene radical (CHOH) or a radical of the formula $CHOR^{11}$ wherein $R^{11}$ stands for a hydrogenolysable radical, or $R^9$ has the same meaning as $R^5$, and $R^{10}$ stands for a radical of the formula $CHOR^{11}$ wherein $R^{11}$ has the meaning stated above.

It is to be understood that when, in the starting material, $R^9$ stands for a hydrogenolysable radical, $R^5$ in the product stands for hydrogen.

As a suitable value for $R^{11}$, and for $R^9$ when it stands for a hydrogenolysable radical, there may be mentioned, for example, the benzyl radical. The hydrogenolysis may be effected, for example, by catalytic hydrogenation, for example hydrogenation in the presence of a palladium-on-charcoal catalyst, in an inert diluent or solvent, for example ethanol.

According to a further feature of the invention we provide a process for the manufacture of those of the alkanolamine derivatives of the invention wherein Y stands for the oxygen atom, $R^5$ stands for hydrogen and $R^6$ stands for a radical of the formula $-CHR^{12}R^{13}$ wherein $R^{12}$ stands for hydrogen and $R^{13}$ stands for a branched-chain alkyl radical, an aralkyl radical or an aryl radical, optionally substituted, or $R^{12}$ stands for an alkyl radical and $R^{13}$ stands for an alkyl or aralkyl radical, or an aryl radical, optionally substituted, which comprises the interaction of an amino derivative of the formula:

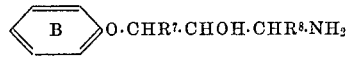

wherein $R^7$, $R^8$ and B have the meanings stated above for the case where Y stands for the oxygen atom, with a carbonyl compound of the formula $R^{12}.CO.R^{13}$ wherein $R^{12}$ and $R^{13}$ have the meanings stated above, under reducing conditions.

Suitable reducing conditions are those provided by the presence of hydrogen and a hydrogenation catalyst, for example platinum, in an inert diluent or solvent, for example ethanol, and/or, in the case where, in the said carbonyl compound used as starting material, $R^{12}$ stands for an alkyl radical, in an excess of the carbonyl compound used as starting material; or by the presence of an alkali metal borohydride, for example sodium borohydride, in an inert diluent or solvent, for example aqueous methanol, and/or in an excess of the carbonyl compound used as starting material.

According to a further feature of the invention we provide for a process for the manufacture of those of the alkanolamine derivatives of the invention wherein Y stands for the sulphur atom, $R^5$ stands for hydrogen and $R^6$ stands for a radical of the formula $-CHR^{14}R^{15}$, wherein $R^{14}$ stands for hydrogen or an alkyl radical, and $R^{15}$ stands for an alkyl or aralkyl radical, or an aryl radical, optionally substituted, which comprises the interaction of an amino derivative of the formula:

wherein $R^3$, $R^4$ and A have the meanings stated above, with a carbonyl compound of the formula $R^{14}.CO.R^{15}$, wherein $R^{14}$ and $R^{15}$ have the meanings stated above, under reducing conditions.

Suitable reducing conditions are those described above for the corresponding reaction wherein Y stands for the oxygen atom.

It is to be understood that the said amino derivatives may be generated in situ by, for example, reduction of the corresponding α-diazoketone, α-azidoketone, α-hydroxyiminoketone, α-nitroketone, α-nitro-alcohol, cyanhydrin or acyl cyanide.

According to a further feature of the invention we provide a process for the manufacture of those of the alkanolamine derivatives of the invention wherein the benzene ring (B) bears a hydroxy substituent, and optionally may be further substituted, which comprises the hydrogenolysis of a compound of the formula:

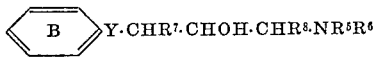

wherein $R^5$, $R^6$, $R^7$, $R^8$ and Y have the meanings stated above, and wherein the benzene ring (B) bears a substitutent of the formula —$OR^{11}$, wherein $R^{11}$ has the meaning stated above, and wherein the benzene ring (B) may optionally be further substituted.

As indicated above, a suitable value for $R^{11}$ is, for example, the benzyl radical. The hydrogenolysis may be effected, for example, by catalytic hydrogenation, for example hydrogenation in the presence of a palladium-on-carbon catalyst, in an inert diluent or solvent, for example ethanol.

According to a further feature of the invention we provide a process for the manufacture of alkanolamine esters of the invention which comprises the interaction of the corresponding alkanolamine derivative or a salt thereof with an acylating agent.

As suitable acylating agents there may be mentioned acid halides or anhydrides derived from saturated or unsaturated aliphatic carboxylic acids or from aromatic carboxylic acids, for example acetic anhydride or benzoyl chloride. The acylation may be carried out in a diluent or solvent, which, in the case where an acid anhydride is used as acylating agent, may conveniently be the acid from which the anhydride is derived.

According to a further feature of the invention we provide a process for the manufacture of those of the alkanolamine derivatives of the invention wherein Y stands for the oxygen atom and the benzene ring (B) bears an arylsulphonyl substituent, which comprises the oxidation of a compound of the formula:

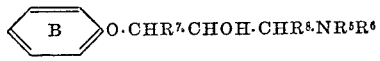

wherein $R^5$, $R^6$, $R^7$ and $R^8$ have the meanings stated above in the case where Y stands for the oxygen atom, and wherein the benzene ring (B) bears an arylthio substituent.

As a suitable oxidizing agent or procedure there may be mentioned any oxidizing agent or procedure which is known to effect the conversion of an arylthioaryl radical into the corresponding arylsulphonylaryl radical, for example hydrogen peroxide.

The invention is illustrated but not limited by the following examples in which the parts are by weight:

EXAMPLE 1

A mixture of 50 parts of 1 - (2 - chlorophenoxy) - 3-isopropylamino-2-propanol, 125 parts of maize starch, 270 parts of calcium phosphate and 1 part of magnesium stearate is compressed, and the compressed material is then broken down into granules by passage through a 16-mesh screen. The resultant granules are compressed into tablets according to the known art. There are thus obtained tablets which are suitable for oral use for therapeutic purposes.

The 1-(2-chlorophenoxy)-3-isopropylamino-2-propanol is replaced by any one of the 1-amino-3-phenoxy-2-propanol or 1-amino-3-phenylthio-2-propanol derivatives described in Examples 10–35 hereinafter, and in a similar manner there are obtained tablets which are suitable for oral use for therapeutic purposes.

EXAMPLE 2

89 parts of spray-dried lactose are passed through a 60-mesh sieve, and then mixed with 5 parts of maize starch and 1 part of magnesium stearate. The mixture is passed through a 60-mesh sieve, and then thoroughly mixed with 5 parts of 1-isopropylamino-3-(3-tolyloxy)-2-propanol hydrochloride. The mixture is passed through a 60-mesh sieve, and then compressed into tablets according to the known art. There are thus obtained tablets which are suitable for oral use for therapeutic purposes.

The 1-isopropylamino-3-(3-tolyloxy)-2-propanol is replaced by any of the compounds listed in the following table, and in a similar manner there are obtained tablets which are suitable for oral use for therapeutic purposes:

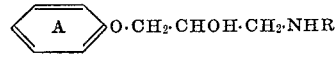

| A | R |
|---|---|
| 2-chlorophenyl | Isopropyl. |
| 3-tolyl | Do. |
| 4-tolyl | Do. |
| 2,3-dimethylphenyl | Do. |
| 3,4-dimethylphenyl | Do. |
| 3,5-dimethylphenyl | Do. |
| 3-ethyl-5-methylphenyl | Do. |
| 3-chlorophenyl | Do. |
| 2,3-dichlorophenyl | Do. |
| 3,5-dichlorophenyl | Do. |
| 2,4,5-trichlorophenyl | Do. |
| 3-fluorophenyl | Do. |
| 4-chloro-3-methylphenyl | Do. |
| 3-methoxyphenyl | Do. |
| 2-hydroxyphenyl | Do. |
| 3-nitrophenyl | Do. |
| 3-trifluoromethylphenyl | Do. |
| 2-diphenylyl | Do. |
| 3,5-dimethylphenyl | 1-methyl-3-phenylpropyl. |
| 2,3-dichlorophenyl | s-Butyl. |
| 3-tolyl | 2-hydroxy-1,1-dimethylethyl. |
| Do. | t-Butyl. |
| 2-phenoxyphenyl | Isopropyl. |
| 3-phenoxyphenyl | Do. |
| 2-benzoyl-5-methoxyphenyl | Do. |
| 4-anilinophenyl | Do. |
| 2-(4-tolyloxy)phenyl | Do. |

EXAMPLE 3

A mixture of 50 parts of 1-(4-chlorophenoxy)-3-isopropylamino-2-propanol and 150 parts of maize starch is filled into hard gelatine capsules. The composition so obtained is suitable for oral use for therapeutic purposes.

EXAMPLE 4

200 parts of coconut oil, 780 parts of arachis oil and 20 parts of beeswax are melted together at a temperature not exceeding 100° C., and 0.75 part of propyl gallate is then added and dissolved by stirring. The oily solution is stirred and allowed to cool to ambient temperature. 0.4 part of 1-isopropylamino-3-(3-tolyloxy)-2-propanol hydrochloride, 40 parts of icing sugar and 0.6 part of saccharin sodium are mixed together for 10 minutes, and 58.6 parts of the above-mentioned oily solution are added slowly with continual stirring. A suitable flavouring agent is added, and mixing is continued for 30 minutes. There is thus obtained an oily suspension suitable for oral administration for therapeutic purposes.

EXAMPLE 5

A solution of 1 part of 1-isopropylamino-3-(3-tolyloxy)-2-propanol hydrochloride in 100 parts of distilled water is filled into ampoules. The ampoules are sealed and then heated at 115° C. for 30 minutes. There are thus obtained ampoules containing a sterile aqueous solution suitable for parenteral administration for therapeutic purposes.

The above process is repeated except that a solution of 0.1 part of sodium metabisulphite and 1 part of 1-isopropylamino-3-(3-tolyloxy)-2-propanol hydrochloride in 100 parts of distilled water is filled into ampoules and then treated as described above. There are thus obtained ampoules containing a sterile aqueous solution suitable for parenteral administration for therapeutic purposes.

EXAMPLE 6

A solution of 1 part of 1-isopropylamino-3-(3-tolyloxy)-2-propanol hydrochloride in 100 parts of distilled water is passed through a sterilising filter. The sterile filtrate is filled into sterile ampoules under aseptic conditions. There are thus obtained ampoules containing a sterile aqueous solution suitable for parenteral administration for therapeutic purposes.

EXAMPLE 7

A mixture of 1 part of di-[1-isopropylamino-3-(3-tolyloxy)-2-propanol] 1,1'-methylene-bis-(2-hydroxy-3-naphthoate), 40 parts of sucrose, 0.5 part of a cetyl alcohol-polyethylene oxide-condensate, 1 part of polyvinylpyrrolidone, 0.25 part of methyl p-hydroxybenzoate and 100 parts of water is ball-milled for several hours. After the incorporation of suitable colouring and flavouring agents there is obtained a suspension suitable for oral administration for therapeutic purposes.

EXAMPLE 8

200 parts of di-[1-isopropylamino-3-(3-tolyloxy)-2-propanol] 1,1' - methylene-bis-(2-hydroxy-3-naphthoate) are milled to a fine powder, sterilised by heating at 120° C. for 3 hours, and then mixed with 20 parts of sterile, finely-powdered sodium carboxymethylcellulose. The resulting powder is thoroughly mixed together with 100 parts of a sterile 2% solution of polyoxyethylene-sorbitan monooleate in water, and the resulting mixture is dried. The dry, sterile product is introduced into vials which are then sealed. Addition of sterile water to the powder, followed by shaking, produces a suspension suitable for intramuscular injection for therapeutic purposes.

EXAMPLE 9

A mixture of 2 parts of aluminium stearate and 98 parts of arachis oil is gelled and sterilised by stirring and heating at 150° C. The mixture is then cooled, 1 part of sterile 1 - isopropylamino-3-(3-tolyloxy)-2-propanol hydrochloride is added, and the mixture is ball-milled under sterile conditions to reduce the particle size of the active ingredient to below 50 microns. There is thus obtained a sterile oily suspension suitable for intramuscular injection for therapeutic purposes.

EXAMPLE 10

A mixture of 2.03 parts of 1-chloro-3-(2,3-dimethylphenoxy)-2-propanol and 15 parts of isopropylamine is heated in a sealed vessel at 70–80° C. for 10 hours. The excess isopropylamine is removed by distillation under reduced pressure. The solid residue is stirred together with water, and the mixture is filtered. The solid residue is suspended in water and 2 N-hydrochloric acid is added until dissolution is effected. The solution is washed with 50 parts of ether and then made alkaline with 2 N sodium hydroxide solution, and the resulting mixture is filtered. The solid residue is washed with water, dried and crystallised from petroleum ether (B.P. 60–80° C.) containing a small amount of petroleum ether (B.P. 100–120° C.). There is thus obtained 1-(2,3-dimethylphenoxy)-3-isopropylamino-2-propanol, M.P. 110–112° C.

The 1-chloro-3-(2,3-dimethylphenoxy)-2-propanol used as starting material may be obtained as follows:

A mixture of 12.2 parts of 2,3-xylenol, 25 parts of epichlorohydrin and 0.25 part of piperidine is heated at 90° C. for 6 hours. Excess epichlorohydrin is removed by distillation under reduced pressure. The residue is cooled, dissolved in an equal volume of chloroform, and the solution is shaken with excess concentrated hydrochloric acid. The mixture is separated, the chloroform layer is washed with water until the washings are acid-free, dried over anhydrous sodium sulphate, and filtered. After removal of the solvent by distillation under reduced pressure, the residue is fractionally distilled in vacuo. There is thus obtained 1-chloro-3-(2,3-dimethylphenoxy)-2-propanol, B.P. 118° C. at 0.22 mm.

The above procedure is repeated using the appropriate chlorohydrins and amines as starting materials and in a similar manner there are obtained the compounds listed in the following table. Except in the case of the last two hydrochlorides listed in the table, the acid-addition salts described are obtained by the addition of an ethereal solution of the appropriate acid to an ethereal solution of the base, followed by filtration of the resulting mixture and crystallisation of the solid residue from the indicated solvent or solvent mixture. By contrast, the last two hydrochlorides listed in the following table are obtained by suspending the crude base in water, strongly acidifying the suspension with 10 N hydrochloric acid and allowing the resulting solution to stand. The corresponding hydrochloride crystallises out and is filtered off and crystallised from the indicated solvent or solvent mixture.

A⟩O.CH₂.CHOH.CH₂.NHC₃H₇(iso)

| A | Base or salt | M.P. (°C.) | Crystallisation solvent(s) |
|---|---|---|---|
| 3-tolyl | Base | 79 | Mixture of pet. ether 40° C./60° C. and 60° C./80° C. |
| Do | Hydrochloride | 121–122 | Ethyl acetate/ethanol. |
| 4-tolyl | Base | 91–92 | Cyclohexane. |
| 2,4-dimethylphenyl | do | 76–77 | Pet. ether 60° C./80° C. |
| 2,3-dimethylphenyl | do | 110–112 | Mixture of pet. ether 60° C./80° C. and 100° C./120° C. |
| 2,5-dimethylphenyl | do | 68–69 | Pet. ether 60° C./80° C. |
| 3,4-dimethylphenyl | Hydrochloride | 148–149 | Ethyl acetate/ethanol. |
| 3,5-dimethylphenyl | Base | 108–109 | Cyclohexane. |
| 2,6-diethylphenyl | Hydrochloride | 131–132 | Ethyl acetate. |
| 2,4-di-t-butylphenyl | do | 191–192 | Do. |
| 2-isopropyl-5-methylphenyl | do | 159–160 | Do. |
| 2-t-butyl-5-methylphenyl | do | 175–176 | Ethyl acetate/ethanol. |
| 3-ethyl-5-methylphenyl | Base | 86–87 | Pet. ether 60° C./80° C. |
| 2,3,6-trimethylphenyl | Hydrochloride | 129–130 | Ethyl acetate. |
| 4-isopropylphenyl | Hydrogen oxalate | 179–180 | Ethyl acetate/ethanol. |
| 3-chlorophenyl | Base | 88–89 | Pet. ether 60° C./80° C. |
| 4-chlorophenyl | do | 99–100 | Cyclohexane. |
| 2,3-dichlorophenyl | do | 96–97 | Do. |
| 2,4-dichlorophenyl | do | 90–91 | Do. |
| 2,5-dichlorophenyl | do | 83 | Do. |
| 3,4-dichlorophenyl | do | 124–125 | Do. |
| 3,5-dichlorophenyl | do | 117–118 | Do. |
| 2,4,5-trichlorophenyl | do | 114–115 | Do. |
| Pentachlorophenyl | do | 127–128 | Do. |
| 3-bromophenyl | do | 94–95 | Do. |
| 4-chloro-3-methylphenyl | do | 119 | Do. |
| 3-chloro-4-methylphenyl | do | 128–129 | Pet. ether 80° C./100° C. |
| 2-chloro-6-methylphenyl | do | 78–79 | Cyclohexane. |
| 4-chloro-3,5-dimethylphenyl | do | 142 | Do. |

| A- | Base or salt | M.P. (°C.) | Crystallisation solvent(s) |
|---|---|---|---|
| 2,4,6-tribromo-3,5-dimethylphenyl | do | 145 | Do. |
| 3-methoxyphenyl | do | 72-73 | Do. |
| 4-methoxyphenyl | do | 82-83 | Do. |
| 2,6-dimethoxyphenyl | do | 82 | Do. |
| 4-methoxy-2-methylphenyl | Hydrogen oxalate | 162-163 | Ethyl acetate/ethanol. |
| 3-t-butyl-4-methoxyphenyl | Base | 95 | Pet. ether 100° C./120° C. |
| 4-n-butoxyphenyl | do | 72-73 | Cyclohexane. |
| 3-nitrophenyl | do | 110-111 | Ethyl acetate. |
| 4-nitrophenyl | Hydrogen oxalate | 230-232 | Dimethylformamide. |
| 3-trifluoromethylphenyl | do | 135-136 | Ethyl acetate/ether. |
| 4-acetylphenyl | Base | 88 | Cyclohexane. |
| 4-diphenylyl | do | 113-114 | Do. |
| 2-diphenylyl | do | 67-68 | Do. |
| 2-hydroxyphenyl | Picrate | 207-208 | Aqueous ethanol. |
| 2,3,5,6-tetramethylphenyl | Hydrochloride | 156-157 | Ethyl acetate. |
| 2-chloro-4-methylphenyl | do | 165-166 | Ethyl acetate/ethanol. |
| 4-anilinophenyl | Base | 136 | Ethyl acetate. |
| 2-phenylthiophenyl | Hydrochloride | 76-78 | 2 N hydrochloric acid. |
| 2-nitrophenyl | Picrate | 157-158 | Water. |
| 2-iodophenyl | Base | 99-99.5 | Cyclohexane. |
| 2-methoxyphenyl | do | 82-83 | Do. |

EXAMPLE 11

In a similar manner to that described in Example 10 and using the appropriate chlorhydrin and amine, followed, where desired, by conversion of the resulting base into the acid-addition salt, there are obtained the compounds listed in the following table (all the hydrochlorides apart from the next to the last one listed are obtained using the procedure involving ethereal hydrochloric acid, the remaining one is obtained using the alternative procedure described in Example 10).

tracted twice with 100 parts of ether. The combined ether extracts are washed with 100 parts of water, dried over anhydrous magnesium sulphate, and filtered. The solvent is removed by distillation. The residue is dissolved in 20 parts of ether, and ethereal oxalic acid is added until precipitation is complete. The mixture is filtered and the solid residue is crystallised from dimethylformamide. There is thus obtained 1-(3-ethoxyphenoxy)-3-isopropylamino-2-propanol oxalate, M.P. 155-156° C.

In a similar manner using the appropriate starting ma-

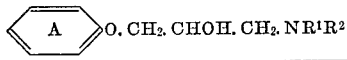

| A- | R¹ | R² | Base or salt | M.P. (°C) | Crystallization solvent(s) |
|---|---|---|---|---|---|
| 3-tolyl | Benzyl | Isopropyl | Picrate | 123-125 | Aqueous ethanol. |
| Do | H | T-Butyl | Oxalate | 204-205 | Ethyl acetate/ethanol. |
| Do | H | s-Butyl | Hydrochloride | 159 | Do. |
| 2,3-dichlorophenyl | H | s-Butyl | do | 159-160 | Do. |
| 3-methoxyphenyl | Methyl | Isopropyl | Picrate | 99-100 | Aqueous ethanol. |
| 3-tolyl | H | 2-hydroxy-1,1-dimethylethyl | Hydrogen oxalate | 85-86 | Do. |
| Do | H | Isobutyl | do | 131-132 | Ethyl acetate/ethanol. |
| Do | H | n-Propyl | Base | 86-87 | Pet.ether 60/80° C. |
| 3,5-dimethyl-phenyl | H | do | do | 82-83 | Do. |
| 2,5-dichlorophenyl | H | do | do | 126-127 | Cyclohexane. |
| 4-chloro-3-methylphenyl | H | 2-hydroxy-1,1-dimethylethyl | Hydrogen oxalate | 192 | Aqueous ethanol. |
| Do | Ethyl | Ethyl | Picrate | 139-140 | Do. |
| 3-methoxyphenyl | H | n-Propyl | Exalate | 146-148 | Ethyl acetate/ethanol. |
| 3,5-dimethylphenyl | H | 2-n-propylethyl | Hydrochloride | 117-118 | Ethyl acetate. |
| Do | H | Ethyl | Base | 95-96 | n-Hexane. |

EXAMPLE 12

A mixture of 1.94 parts of 1,2-epoxy-3-(3-ethoxyphenoxy)propane and 25 parts of isopropylamine is heated under reflux for 2 hours. Excess isopropylamine is removed by distillation under reduced pressure. The residue is dissolved in 2 N hydrochloric acid. The solution is washed twice with 50 parts of ether and then basified with 2 N sodium hydroxide solution. The mixture is exterials there are obtained the compounds listed in the following table:

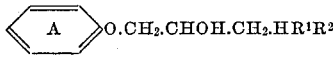

| A- | R¹ | R² | Base or salt | M.P. (°C.) | Crystallisation solvent(s) |
|---|---|---|---|---|---|
| 3-fluorophenyl | H | Isopropyl | Base | 88-89 | Cyclohexane. |
| 3,5-dimethoxyphenyl | H | do | Hydrogen oxalate | 149-150 | Ethyl acetate/ethanol. |
| 2,3-dimethoxyphenyl | H | do | Base | 77-79 | Pet. ether 60/80° C. |
| 3,5-dimethylphenyl | H | Allyl | do | 67-69 | Pet. ether 60/80° C. |
| Do | Allyl | do | Oxalate | 113-114 | Ethylacetate. |
| 3-tolyl | H | Cyclohexyl | Hydrochloride | 171-172 | Ethylacetate/ethanol. |
| 3-phenoxyphenyl | H | Isopropyl | do | 119-121 | Ethylacetate. |
| 2-benzoyl-5-methoxyphenyl | H | do | Hydrogen oxalate | 195 | n-Propanol. |
| 2-benzylphenyl | H | do | Hydrochloride | 106-107 | Ethylacetate. |

EXAMPLE 13

A mixture of 10.8 parts of m-cresol, 25 parts of epichlorohydrin, 4.8 parts of sodium hydroxide and 100 parts of water is stirred at ambient temperature for 24 hours. The mixture is neutralised with glacial acetic acid and then extracted twice with 200 parts of chloroform. The combined chloroform extracts are washed three times with an equal volume of water, and then dried over anhydrous magnesium sulphate. The mixture is filtered and the solvent is removed by distillation under reduced pressure. The residue consists of 1,2 - epoxy - 3 - (3-tolyloxy)-propane. This is refluxed together with 60 parts of isopropylamine for 1 hour, and the mixture is then kept at ambient temperature for 18 hours. Excess isopropylamine is removed by distillation. The residue is suspended in 500 parts of water, and concentrated hydrochloric acid is added until dissolution is effected. The solution is washed twice with an equal volume of ether. The aqueous solution is basified with 2 N sodium hydroxide solution, and the resulting mixture is filtered. The solid residue is washed with water, dried and crystallised from cyclohexane. There is thus obtained 1-isopropylamino-3-(3-tolyloxy)-2-propanol, M.P. 79° C.

In a similar manner by use of 4-benzyloxyphenol in place of m-cresol there is obtained 1-(4-benzyloxyphenoxy)-3-isopropylamino-2-propanol, M.P. 100–101° C. (crystallized from cyclohexane), and by use of pentafluorophenol in place of m-cresol there is obtained 1-isopropylamino-3-pentafluorophenyl - 2 - propanol, M.P. 70–72° C. (crystallised from petroleum ether, B.P. 60° C.–80° C.).

EXAMPLE 14

A mixture of 2.4 parts of 1,2-epoxy-3-(2-phenoxyphenoxy)propane and 10 parts of isopropylamine is heated under reflux for 1 hour. The excess isopropylamine is removed by distillation under reduced pressure. The oily residue is dissolved in 50 parts of 2 N hydrochloric acid, decolourising charcoal is added and the mixture is refluxed for 10 minutes. The mixture is filtered whilst hot, and the filtrate is cooled. The resulting mixture is filtered and the solid residue is crystallised from ethyl acetate. There is thus obtained 1-isopropylamino-3-(2-phenoxyphenoxy)-2-propanol hydrochloride, M.P. 120–122° C.

The 1,2-epoxy-3-(2-phenoxyphenoxy)propane used as starting material may be obtained as follows:

To a solution of 18.6 parts of 2-phenoxyphenol and 4.8 parts of sodium hydroxide in 100 parts of water there are added dropwise, below 20° C., 11.6 parts of epichlorohydrin. The mixture is stirred at ambient temperature for 18 hours and is then extracted twice with 50 parts of chloroform. The combined chloroform extracts are dried with anhydrous magnesium sulphate and then evaporated under reduced pressure. The oily residue consists of 1,2-epoxy-3-(2-phenoxyphenoxy)propane.

In a similar manner using the appropriate starting materials there are obtained 1-isopropylamino-3-[2-(4-tolyloxy)-phenoxy]-2-propanol hydrochloride, M.P. 117–119° C. (crystallised from a mixture of ethyl acetate and ether) and 1-[2-(α,α-dimethylbenzyl)-4-methylphenoxy - 3 - isopropylamino-2-propanol hydrochloride, M.P. 185–186° C. (crystallised from a mixture of ethyl acetate and ethanol).

EXAMPLE 15

2.4 parts of 1-(2-benzylphenoxy)-2,3-epoxypropane and 10 parts of isopropylamino are heated together under reflux for 1 hour. The mixture is cooled, and 20 parts of 2 N hydrochloric acid are added. The precipitate thus formed is separated by decantation and stirred together with 20 parts of 2 N sodium hydroxide solution. The mixture is then extracted with 50 parts of ether and the ethereal extract is dried over anhydrous magnesium sulphate. Ethereal hydrogen chloride is added to the dry ethereal solution until precipitation is complete. The mixture is filtered and the solid residue is washed with ether and then crystallised from ethyl acetate. There is thus obtained 1 - (2-benzylphenoxy)-3-isopropylamino-2-propanol hydrochloride, M.P. 106–107° C.

EXAMPLE 16

A mixture of 2.84 parts of 1-(2-benzoyl-5-methoxyphenoxy)-2,3-epoxypropane and 10 parts of isopropylamine are heated together under reflux for 1 hour. The mixture is evaporated to dryness under reduced pressure. The residue is acidified with 25 parts of 2 N hydrochloric acid and washed with 50 parts of ether. The aqueous solution is added to 50 parts of 2 N sodium hydroxide solution at 0° C., and the mixture is then extracted with 50 parts of ether. The ethereal extract is dried over anhydrous magnesium sulphate. The dry ethereal solution is added to a solution of 1.26 parts of oxalic acid in 5 parts of acetone. The mixture is filtered and the solid residue is crystallised from n-propanol. There is thus obtained 1 - (2-benzoyl-5-methoxyphenoxy)-3-isopropylamino-2-propanol hydrogen oxalate, M.P. 195° C.

EXAMPLE 17

A mixture of 2 parts of 1-amino-3-(3-tolyloxy)-2-propanol hydrochloride, 40 parts of methanol and 10 parts of acetone is adjusted to pH 7 with 2 N sodium hydroxide solution. The solution is heated under reflux for 10 minutes. It is then cooled in ice, and 2 parts of sodium borohydride are added. The mixture is kept at ambient temperature for 18 hours, and is then poured into a mixture of ice and hydrochloric acid. The solution is basified with sodium hydroxide solution and extracted with ether. The ethereal extract is washed twice with an equal volume of water, dried over anhydrous magnesium sulphate, and filtered. The solvent is removed by distillation. The residue is re-dissolved in 10 parts of ethanol, and ethereal hydrochloric acid is added until precipitation is complete. The mixture is filtered and the solid residue is crystallised from an ethyl acetate-ethanol mixture (10:1). There is thus obtained 1-isopropylamino-3-(3-tolyloxy)-2-propanol hydrochloride, M.P. 121–122° C.

The 1-amino-3-(3-tolyloxyl)-2-propanol hydrochloride used as starting material may be obtained as follows:

A mixture of 16.4 parts of 1,2-epoxy-3-(3-tolyloxy)-propane, 9.9 parts of succinimide, 0.5 part of pyridine and 75 parts of ethanol is heated for 4 hours under reflux. The solution is cooled and the resulting mixture is filtered. The solid residue is washed with ethanol and crystallised from a mixture of ethyl acetate and petroleum ether (B.P. 60–80° C.). There is thus obtained 1-succinimido-3-(3-tolyloxy)-2-propanol, M.P. 106–107° C.

A mixture of 10 parts of 1-succinimido-3-(3-tolyloxy)-2-propanol and 40 parts of 10 N hydrochloric acid is heated at 100° C. for 8 hours. The hydrochloric acid is then removed by distillation under reduced pressure. The solid residue is dissolved in 250 parts of water and the resulting solution is washed twice with an equal volume of ether. The aqueous solution is evaporated to dryness by distillation under reduced pressure, and the solid residue is crystallised from a mixture of ethyl acetate and ethanol. There is thus obtained 1-amino-3-(3-tolyloxy)-2-propanol hydrochloride which melts to an opaque semi-solid at 128–129° C. and to a clear liquid at 272° C.

EXAMPLE 18

To a solution of 1 part of 1-(N-benzyl-N-isopropylamino)-3-(3-tolyloxy)-2-propanol in 10 parts of ether there is added an ethereal solution of hydrogen chloride until precipitation is complete. The mixture is evaporated to dryness, and the residue is dissolved in 15 parts of ethanol. 10 parts of palladium-on-charcoal catalyst are added to the solution, and the mixture is shaken at ambient temperature and atmospheric pressure in an atmosphere of hydrogen for 6 hours. The mixture is filtered, and the solvent is removed from the filtrate by distillation under reduced pressure. The solid residue is crystallised from a mixture of ethyl acetate and ethanol (10:1 by weight). There is thus obtained 1-isopropylamino-3-(3-tolyloxy)-2-propanol hydrochloride, M.P. 121–122° C.

The 1-(N-benzyl-N-isopropylamino)-3-(3-tolyloxy) - 2-propanol may be obtained as follows:

A mixture of 14.9 parts of N-benzyl-N-isopropylamine and 10.33 parts of epichlorohydrin is heated and stirred at 85–90° C. for 4 hours and then kept at ambient temperature for 18 hours. The mixture is then shaken together with 50 parts of 20% sodium carbonate solution. The mixture is separated and the organic phase is dissolved in 200 parts of ether. This solution is washed with cold water, dried over anhydrous potassium carbonate, and filtered. After removal of the solvent by distillation, the residue is fractionally distilled in vacuo. There is thus obtained 1-(N-benzyl-N-isopropylamino)-3-chloro-2 - propanol, B.P. 122–130° C./1.0–1.1 mm. A mixture of 4.8 parts of this chlorohydrin together with a solution of 0.92 part of sodium in 36 parts of ethanol, and 2.2 parts of m-cresol is heated in a sealed tube for 10 hours at 100° C. The tube is cooled and the contents are filtered. The filtrate is evaporated to dryness under reduced pressure. The residue is stirred together with 25 parts of 2 N hydrochloric acid and the resulting suspension is washed twice with 50 parts of other. The supernatant aqueous layer is removed by decantation and the residue is stirred together with 25 parts of 2 N sodium hydroxide solution. The mixture is extracted with 150 parts of ether and the ethereal extract is washed with cold water, dried over anhydrous magnesium sulphate, and filtered. To the filtrate there is added a saturated solution of picric acid in ether until precipitation is complete. The mixture is crystallised and the solid residue is crystallised from aqueous ethanol. There is thus obtained 1-(N-benzyl-N-isopropylamino)-3-(3-tolyloxy) - 2-propanol picrate, M.P. 123–125° C. This picrate is suspended in 25 parts of 2 N hydrochloric acid and the suspension is extracted three times with 50 parts of ethyl acetate. The combined ethyl acetate extracts are extracted with 10 N ammonium hydroxide solution, each time with 100 parts, until the ethyl acetate layer is colourless. The ethyl acetate solution is dried over anhydrous magnesium sulphate and the solvent is evaporated under reduced pressure. There is thus obtained 1-(N-benzyl-N-isopropylamino)-3-(3-tolyloxy)-2-propanol.

The 1-(N-benzyl-N-isopropylamino-)-3-(3-tolyloxy)-2-propanol may alternatively be obtained as follows:

A mixture of 10 parts of 1-(N-benzyl-N-isopropylamino)-3-chloro-2-propanol and 25 parts of 50% sodium hydroxide solution is stirred and heated at 100° C. for 4 hours. The mixture is cooled and extracted with ether. The ethereal extract is washed with water, dried over anhydrous magnesium sulphate, and filtered. The solvent is removed from the filtrate by distillation under reduced pressure. The residual syrupy material is fractionally distilled in vacuo, and there is thus obtained 1-(N-benzyl-N-isopropylamino)-2,3-epoxypropane, B.P. 88–92° C./0.15 mm. A mixture of 4.1 parts of the epoxide, a solution of 0.46 part of sodium in 18 parts of ethanol, and 2.16 parts of m-cresol is heated in a sealed tube for 10 hours at 100° C. The 1-(N-benzyl-N-isopropylamino)-3-(3-tolyloxy)-2-propanol is isolated from the reaction mixture in the same manner as that described above.

EXAMPLE 19

A mixture of 2.1 parts of 1-bromo-3-(3-tolyloxy)-2-propanol and 15 parts of isopropylamino is heated in a sealed tube at 100° C. for 6 hours. The product is isolated by a similar procedure to that described in Example 10, and there is obtained 1-isopropylamino-3-(3-tolyloxy)-2-propanol, M.P. 79° C. (crystallised from cyclohexane).

The 1-bromo-3-(3-tolyloxy)-2-propanol used as starting material may be obtained as follows:

A mixture of 9 parts of 3-tolyloxyacetyl chloride in 150 parts of anhydrous ether is added dropwise over a period of 30 minutes to a cooled (—15° C.) solution of 16.5 parts of diazomethane in anhydrous ether. The reaction mixture is stirred gently during the addition and afterwards for 1 hour. The temperature of the solution is allowed to rise to ambient temperature and the solution is kept at this temperature for 18 hours. The solution is then stirred and cooled to —15° C. and 20 parts of 48% hydrobromic acid are added dropwise. The mixture is separated, and the ethereal layer is washed with an equal volume of 5% aqueous sodium carbonate solution and then twice with an equal volume of water. The ethereal solution is dried (anhydrous magnesium sulphate) and the solvent is then removed by distillation under reduced pressure. The residue is 1-bromo-3-(3-tolyloxy)-2-propanone [characterised as the 2,4-dinitrophenylhydrazone, M.P. 128–130° C. (crystallised from ethanol)]. 2 parts of this residue are dissolved in 25 parts of methanol, and the solution is cooled to 0° C. 2 parts of sodium borohydride are added portionwise to the cooled solution and the mixture is kept at ambient temperature for 18 hours. The mixture is poured into a mixture of ice and hydrochloric acid and the resulting acidic solution is extracted three times using an equal volume of chloroform each time. The combined chloroform extracts are washed twice with an equal volume of water, dried over anhydrous magnesium sulphate, and then filtered. The chloroform is then removed by distillation under reduced pressure, and there is obtained as the residue 1-bromo-3-(3-tolyloxy)-2-propanol.

EXAMPLE 20

A mixture of 2 parts of 3-chloro-1-(3-tolyloxy)-2-butanol and 15 parts of isoproplyamino is heated in a sealed vessel at 100° C. for 10 hours. The product is isolated by a similar procedure to that described in Example 10, and there is obtained 3-isopropylamino-1-(3-tolyloxy)-2-butanol monohydrate, M.P. 78–80° C. (crystallised from aqueous ethanol).

The 3-chloro-1-(3-tolyloxy)-2-butanol used as starting material may be obtained as follows:

A solution of 10 parts of 3-tolyloxyacetyl chloride in 150 parts of anhydrous ether is added dropwise over a period of 30 minutes to a well-cooled (—15° C.) and gently-stirred solution of 13.6 parts of diazoethane in 300 parts of anhydrous ether. After the addition, the reaction mixture is stirred for one hour at —10° C. The temperature of the solution is then allowed to rise to ambient temperature, and the solution is kept at ambient temperature for 18 hours. The solution is then cooled to —15° C., and anhydrous hydrogen chloride is bubbled through the solution until the evolution of nitrogen ceases. The solution is then washed twice with an equal volume of water, once with an equal volume of 5% sodium carbonate solution, and again with an equal volume of water. The solution is then dried (anhydrous magnesium sulphate). The solvent is removed under reduced pressure giving, as residue, 3-chloro-1-(3-tolyloxy)-2-butanone [characterised as the 2,4-dinitrophenylhydrazone, M.P. 118–119° C. (crystallised from ethanol)]. 5 parts of this residue are dissolved in 25 parts of methanol, and the solution is cooled to 0° C. To the solution 5 parts of sodium borohydride are added in portions, and the resulting mixture is kept at ambient temperature for 4 hours. The mixture is poured into a mixture of ice and hydrochloric acid, and the resulting solution is extracted twice with equal volumes of ether. The combined extracts are washed with an equal volume of water, and dried (anhydrous magnesium sulphate). The solvent is removed by distillation under reduced pressure, and there is obtained as the residue 3-chloro-1-(3-tolyloxy)-2-butanol.

EXAMPLE 21

The procedure described in Example 20 is repeated except that the 3-chloro-1-(3-tolyloxy)-2-butanol is replaced by 1-chloro-3-(3-tolyloxy)-2-butanol, and there is thus obtained 1-isopropylamino-3-(3-tolyloxy)-2-butanol oxalate hydrate, M.P. 98–108° C. (crystallised from a mixture of ethyl acetate and ethanol). This compound is separated into its two diastereoisomers in the following way:

The compound is heated at 80° C. together with 20 parts of ethyl acetate for 10 minutes, and the hot mixture is then filtered, both the solid residue and the filtrate being retained. The solid residue is crystallised several times from a mixture of ethyl acetate and ethanol until material of constant melting point is obtained. There is thus obtained one diastereoisomer of 1-isopropylamino-3-(3-tolyloxy)-2-butanol oxalate, M.P. 151–152° C. The above-mentioned filtrate is cooled and the resulting mixture is filtered. The solid residue is crystallised several times from ethyl acetate until material of constant melting point is obtained, and there is thus obtained the other diastereoisomer of 1 - isopropylamino-3-(3-tolyloxy) - 2-butanol oxalate, M.P. 92–94° C.

The 1-chloro-3-(3-tolyloxy)-2-butanol used as starting material may be obtained by a similar procedure to that described in Example 20 starting from α-(3-tolyloxy)propionyl chloride and diazomethane, and α-(3 - tolyloxy) propionyl chloride itself may be obtained as follows:

A mixture of 10 parts of a α-(3-tolyloxy)propionic acid and 6.6 parts of thionyl chloride is heated at 60° C. for 4 hours. The mixture is cooled, stirred together with 20 parts of petroleum ether (B.P. 60–80° C.), and filtered. The filtrate is evaporated under reduced pressure and there is obtained, as residue, α-(3-tolyloxy)propionyl chloride.

EXAMPLE 22

A mixture of 1.09 parts of 1-amino-3-(3-tolyloxy)-2-propanol hydrochloride, 0.84 part of cyclopentanone, 0.1 part of platinum oxide, and 5.0 parts of ethanol is shaken at ambient temperature and atmospheric pressure in an atmosphere of hydrogen until the uptake of hydrogen ceases. The reaction mixture is filtered, and the filtrate is evaporated to dryness under reduced pressure. The residue is suspended in dilute hydrochloric acid, and the suspension is washed twice with an equal volume of ether. The aqueous solution is basified with 2 N sodium hydroxide solution and then extracted twice with equal volumes of ether. The combined ethereal extracts are washed with 100 parts of water, dried over anhydrous magnesium sulphate, and filtered. The solvent is removed by distillation, and the residue is crystallised from petroleum ether (B.P. 60–80° C.) There is thus obtained 1-cyclopentylamino-3-(3-tolyloxy)-2-propanol, M.P. 80–81° C.

EXAMPLE 23

A mixture of 1.09 parts of 1-amino-3-(3-tolyloxy)-2-propanol hydrochloride, 1.48 parts of methylphenethyl ketone, 35 parts of ethanol and 0.1 part of platinum oxide is shaken in an atmosphere of hydrogen at ambient temperature and atmospheric pressure until the uptake of hydrogen ceases. The mixture is filtered, and the filtrate is evaporated to dryness under reduced pressure. The residue is suspended in dilute hydrochloric acid, and the suspension is shaken together with an equal volume of ether. The mixture is filtered and the solid residue is crystallised from ethyl acetate. There is thus obtained 1-(1-methyl-3-phenylpropylamino) - 3 - (3-tolyloxy)-2-propanol hydrochloride, M.P. 146–151° C.

In a similar manner, but using 2-nonanone in place of methyl phenethyl ketone, there is obtained 1-(1-methyloctylamino)-3-(3-tolyloxy) - 2 - propanol hydrochloride, M.P. 110–120° C.

In a similar manner, but using acetone in place of methyl phenethyl ketone, there is obtained 1-isopropylamino-3-(3-tolyloxy) - 2 - propanol hydrochloride, M.P. 121–122° C. (crystallised from a mixture of ethyl acetate and ethanol).

EXAMPLE 24

A mixture of 25 parts of 1-(3,5-dimethyl-phenoxy)-2,3-epoxypropane and 21 parts of 1 - methyl-3-phenylpropylamine is heated at 100° C. for 2 hours. The mixture is cooled and dissolved in 300 parts of ether, and dry hydrogen chloride is passed into the solution until precipitation is complete. The mixture is filtered, the solid residue is suspended in ether, and the suspension is stirred for 24 hours. The mixture is filtered, the solid residue is suspended in ethyl acetate, and the mixture is stirred for 2 hours. The mixture is filtered and there is obtained, as solid residue, crude 1-(3,5-dimethylphenoxy)-3-(1-methyl - 3 - phenylpropylamino)-2-propanol hydrochloride, M.P. 118–132° (product A). This product is crystallised from ethyl acetate, and there is obtained a mixture of diastereoisomers of 1-(3,5-dimethylphenoxy)-3-(1-methyl - 3 - phenylpropylamine)-2-propanol hydrochloride, M.P. 139–142° C.

Product A may be separated into two pure diastereoisomers as follows:

A mixture of 20 parts of product A and 200 parts of ethyl acetate is heated under reflux for 10 minutes, and the mixture is then filtered while hot. Both the solid residue and the filtrate (B) are retained. The solid residue is crystallised from a mixture of ethyl acetate and ethanol until its melting point is constant. There is thus obtained one diastereoisomer of 1 - (3,5-dimethylphenoxy)-3-(1-methyl - 3 - phenylpropylamino)-2-propanol hydrochloride, M.P. 149–151° C.

The filtrate (B) is allowed to cool to ambient temperature, and the resulting mixture is filtered. The filtrate is cooled to 0° C., and the resulting mixture is filtered. The solid residue is stirred together with 20 parts of 2 N sodium hydroxide solution, and the mixture is extracted with an equal volume of ether. The ethereal extract is washed with water, dried over anhydrous magnesium sulphate, and filtered. The solvent is removed under reduced pressure, 2.5 parts of the residue are dissolved in 100 parts of ether, and a solution of 1.65 parts of oxalic acid in 200 parts of ether is added to the solution. The resulting mixture is filtered, and the solid residue is refluxed with a mixture of ethyl acetate and ethanol for 10 minutes, and then filtered whilst hot. The filtrate is cooled to 0° C., and the resulting mixture is filtered. The filtrate is evaporated to dryness under reduced pressure, the residue is dissolved in 1 part of ethanol, and 10 parts of ether are added. The mixture is filtered, and the solid residue is shaken together with 7 N ammonium hydroxide solution until complete dissolution is effected. The solution is extracted with an equal volume of ether, and the ethereal extract is washed with water, dried over anhydrous magnesium sulphate, and filtered. The filtrate is evaporated to small volume, and ethereal hydrochloric acid is added. The crystalline solid which separates on standing is filtered off and crystallised from ethyl acetate until its melting point is constant. There is thus obtained the other diastereoisomer of 1 - (3,5 - dimethylphenoxy)-3-(1-methyl-3-phenylpropylamino)-2-propanol hydrochloride, M.P. 136–137° C.

The above procedure for the preparation of a mixture of diastereoisomers of 1-(3,5-dimethylphenoxy)-3-(1-methyl-3-phenylpropylamino)-2-propanol hydrochloride is repeated, except that 49.2 parts of 1,2-epoxy-3-(3-tolyloxy)-2-propane and 44.7 parts of 1-methyl-3-phenylpropylamine are used as starting materials. There is thus obtained a mixture of diastereoisomers of 1-(1-methyl-3-phenylpropylamino)-3-(3-tolyloxy)-2-propanol hydrochloride, M.P. 110–130° C.

EXAMPLE 25

2 parts of 100 volume hydrogen peroxide are added to a solution of 0.7 part of 1-isopropylamino-3-(2-phenylthiophenoxy)-2-propanol hydrochloride in 4 parts of glacial acetic acid, and the mixture is kept at ambient temperature for 18 hours. The mixture is then basified with 2 N sodium hydroxide solution and extracted with a mixture of 25 parts of ether and 25 parts of ethyl acetate. The extract is dried with anhydrous magnesium sulphate, and to it there is added a solution of oxalic acid in ether until precipitation is substantially complete. The mixture is filtered, and the solid residue is washed with ether and crystallised from n-propanol. There is thus obtained 1 - isopropylamino - 3-(2-phenylsulphonylphenoxy)-2-propanol hydrogen oxalate, M.P. 184° C. with decomposition.

EXAMPLE 26

A mixture of 3 parts of 1-(4-benzyloxyphenoxy)-3-isopropylamino-2-propanol, 0.1 part of palladium-on-charcoal catalyst, 40 parts of ethanol and 0.1 part of concentrated hydrochloric acid is shaken in an atmosphere of hydrogen at ambient temperature and atmospheric pressure until uptake of hydrogen ceases. The mixture is filtered and the filtrate is evaporated to dryness under reduced pressure. The residue is crystallised from a mixture of ethyl acetate and ethanol, and there is obtained 1-(4-hydroxyphenoxy)-3-isopropylamino-2-propanol hydrochloride, M.P. 167–168° C.

EXAMPLE 27

A mixture of 1.36 parts of p-anisaldehyde, 1.09 parts of 1-amino-3-(3-tolyloxy)-2-propanol hydrochloride, 0.1 part of platinium oxide, and 50 parts of ethanol is shaken in an atmosphere of hydrogen at ambient temperature and atmospheric pressure until the uptake of hydrogen ceases. The mixture is filtered, and the filtrate is evaporated to dryness under reduced pressure. The residue is crystallised from a mixture of ethyl acetate and ethanol, and there is thus obtained 1-(4-methoxybenzylamino)-3-(3-tolyloxy)-2-propanol hydrochloride, M.P. 147–149° C.

EXAMPLE 28

A mixture of 2.16 parts of 1-chloro-3-(4-tolylthio)-2-propanol and 10 parts of isopropylamine is heated in a sealed vessel at 90–100° C. for 10 hours. The excess isopropylamine is then removed by distillation under reduced pressure. The residue is acidified with 50 parts of 2 N hydrochloric acid and the mixture is filtered. The solid residue is washed with water, dried and crystallised from a mixture of ethyl acetate and ethanol. There is thus obtained 1 - isopropylamino-3-(4-tolylthio)-2-propanol hydrochloride, M.P. 189–191° C.

EXAMPLE 29

A mixture of 2 parts of 1-chloro-3-(4-chlorophenylthio)-2-propanol and 10 parts of isopropylamine is heated in a sealed vessel at 70–80° C. for 10 hours. The vessel is cooled, and to the contents there are added 50 parts of water. The mixture is acidified with 20 parts of 11 N hydrochloric acid, and then filtered. The solid residue is crystallised from water, and there is thus obtained 1-(4-chlorophenylthio) - 3-isopropylamino-2-propanol hydrochloride, M.P. 192–194° C.

The 1-chloro-3-(4-chlorophenylthio)-2-propanol used as starting material in the manufacture of 1-(4-chlorophenylthio)-3-isopropylamino-2-propanol may be obtained as follows:

A mixture of 14.45 parts of 4-chlorothiophenol, 25 parts of epichlorohydrin and 0.25 part of piperidine is heated at 90° C. for 6 hours. The mixture is then fractionally distilled under reduced pressure, and there is thus obtained 1 - chloro - 3-(4-chlorophenylthio)-2-propanol, B.P. 128° C./0.15 mm.

EXAMPLE 30

A mixture of 3.6 parts of 1-chloro-(3-tolylthio)-2-propanol and 30 parts of isopropylamine is heated in a sealed vessel at 100° C. for 10 hours. Excess isopropylamine is then removed by distillation under reduced pressure. The residue is suspended in water and concentrated hydrochloric acid is added until dissolution is effected. The solution is washed twice with an equal volume of ether, and then made alkaline with 2 N sodium hydroxide solution. The mixture is extracted twice with an equal volume of ether, and the combined extracts are washed with an equal volume of water. The organic solution is dried (anhydrous magnesium sulphate), and the solvent is removed by distillation under reduced pressure. The residue is re-dissolved in a small amount of ether, and ethereal hydrochloric acid is added until precipitation is complete. The mixture is filtered and the solid residue is crystallised from ethyl acetate. There is thus obtained 1-isopropylamino-3-(3-tolylthio)-2-propanol hydrochloride, M.P. 127–129° C.

EXAMPLE 31

A mixture of 2.2 parts of 1-isopropylamino-3-(3-tolyloxy)-2-propanol, 10 parts of acetic acid, and 2 parts of acetic anhydride is kept at ambient temperature for 18 hours. Ice is then added, and the mixture is basified with ammonium hydroxide solution. The mixture is extracted with 50 parts of ether, and the ethereal extract is dried with anhydrous magnesium sulphate. An ethereal solution of hydrochloric acid is added to the dry ethereal solution until precipitation is complete. The mixture is filtered, and the solid residue is crystallised from a mixture of benzene and ether. There is thus obtained 1-isopropylaminomethyl-2-(3-tolyloxy)ethyl acetate as its hydrochloride, M.P. 130–132° C.

EXAMPLE 32

A mixture of 2.6 parts of 1-isopropylamino-3-(3-tolyloxy)-2-propanol hydrochloride and 6 parts of benzoyl chloride is heated for 6 hours at 100° C. The mixture is then cooled and 50 parts of ether are added. The mixture is stirred, the ether is decanted, and a further 50 parts of ether are added. The mixture is again stirred and is then filtered. The solid residue is washed with ether and dried. The solid is crystallised from a mixture of benzene and ether, and there is obtained 1-isopropylaminomethyl-2-(3-tolyloxy)ethyl benzoate as its hydrochloride, M.P. 118–120° C.

EXAMPLE 33

A solution of 0.25 part of 1-isopropylamino-3-(3-tolyloxy)-2-propanol in 15 parts of ethyl acetate is added to a solution of 0.2 part of benzoic acid in 10 parts of ether. The mixture is filtered and the solid residue is washed with ether. There is thus obtained 1-isopropylamino - 3 - (3 - tolyloxy)-2-propanol benzoate, M.P. 151–152° C. (crystallised from ethyl acetate).

By replacing the benzoic acid in the above example with 0.25 part of β-naphthoic acid there is similarly obtained 1 - isopropylamino - 3 - (3 - tolyloxy) - 2 - propanol β - naphthoate, M.P. 113–114° C. (crystallised from a mixture of n-hexane and ethyl acetate).

By replacing the benzoic acid in the above example with 0.2 part of adipic acid there is similarly obtained 1-isopropylamino-3-(3-tolyloxy)-2-propanol adipate, M.P. 124–126° C. (crystallised from ethyl acetate).

EXAMPLE 34

A solution of 0.65 part of 1-isopropylamino-3-(3-tolyloxy)-2-propanol hydrochloride in 10 parts of water is added to a solution of 1 part of disodium 1,1'-methylenebis - (2 - hydroxy - 3-naphthoic acid) in 10 parts of water. The mixture is stirred and filtered. The solid residue is washed with water, dried and crystallised from a mixture of 10 parts of ethyl acetate and 20 parts of ether. There is thus obtained di-[1-isopropylamino-3-(3-tolyloxy) - 2 - propanol]-1,1' - methylene - bis - (2 - hydroxy-3-naphthoate), M.P. 186–188° C.

EXAMPLE 35

To a solution of 1 part of 1-isopropylamino-3-(3-tolyloxy)-2-propanol hydrochloride in 10 parts of water there is added a suspension of 10 parts of a sulphonated polystyrene resin ["Zeo-Karb" 225(SCR 9)-"Zeo-Karb" is a trademark] in 40 parts of water. The mixture is stirred for 1 hour at ambient temperature. It is then filtered and the solid residue is washed with water. There is thus obtained a complex salt of 1-isopropylamino-3-(3-tolyloxy)-

2-propanol with a sulphonated polystyrene resin which has a base content of 13.5%.

What we claim is:

1. A compound which is a member selected from the group consisting of compounds of the formula:

$$Ar \cdot O \cdot CH_2 \cdot CHOH \cdot CH_2 \cdot NHR^1$$

wherein Ar is a member selected from the group consisting of 3-tolyl, 4-tolyl, 2,3-dimethylphenyl, 2,4-dimethylphenyl, 2,5 - dimethylphenyl, 3,4-dimethylphenyl, 3,5 - dimethylphenyl, 2-iodophenyl, 3-chlorophenyl, 3-bromophenyl, 3-fluorophenyl, 2,3-dichlorophenyl, 2,4-dichlorophenyl, 2,5-dichlorophenyl, 3,4-dichlorophenyl, 3,5 - dichlorophenyl, 2,4,5-trichlorophenyl, 4-chloro-3-methylphenyl, 4 - chloro - 2-methylphenyl, 2-chloro-4-methylphenyl, 2 - chloro-5-methylphenyl, 4-chloro-3,5-dimethylphenyl, 3-methoxyphenyl, 2,3-dimethoxyphenyl, 2 - hydroxyphenyl, 3 - nitrophenyl, 2-phenylphenyl, 2-benzylphenyl, 2-phenoxyphenyl, 3-phenoxyphenyl, 2-p-tolyloxyphenyl, 2 - benzoyl-5-methoxyphenyl and 4-N-anilinophenyl; and $R^1$ is a member selected from the group consisting of isopropyl, s-butyl, t-butyl and 1-methyl - 3-phenylpropyl; and pharmaceutically-acceptable acid-addition salts thereof.

2. A compound as claimed in claim 1 which is selected from the group consisting of 1-(3-tolyloxy)-3-isopropylamino-2-propanol and the pharmaceutically-acceptable acid-addition salts thereof.

3. A compound as claimed in claim 1 which is selected from the group consisting of 1-(3,5-dimethylphenoxy)-3-isopropylamino-2-propanol and the pharmaceutically-acceptable acid addition salts.

4. A compound as claimed in claim 1 which is selected from the group consisting of 1-(3-chlorophenoxy)-3-isopropylamino-2-propanol and the pharmaceutically-acceptable acid solution salts.

5. A compound as claimed in claim 1 which is selected from the group consisting of 1-(2,3-dichlorophenoxy)-3-isopropylamino-2-propanol and the pharmaceutically-acceptable acid addition salts.

6. A compound as claimed in claim 1 which is selected from the group consisting of 1-(3,5-dichlorophenoxy)-3-isopropylamino-2-propanol and the pharmaceutically-acceptable acid addition salts.

7. A compound as claimed in claim 1 which is selected from the group consisting of 1-(2-phenoxy-phenoxy)-3-isopropylamino-2-propanol and the pharmaceutically-acceptable acid addition salts.

8. A compound as claimed in claim 1 which is selected from the group consisting of 1-t-butylamino-3-(3-tolyloxy) - 2 - propanol, and the pharmaceutically-acceptable acid addition salts thereof.

9. A compound as claimed in claim 1 which is selected from the group consisting of 1-[2-(4-tolyloxy)phenoxy]-3 - isopropylamino-2-propanol and the pharmaceutically-acceptable acid-addition salts thereof.

10. A compound as claimed in claim 1 which is selected from the group consisting of 1-(3-5-dimethylphenoxy) - 3 - (1 - methyl-3-phenylpropylamino)-2-propanol and the pharmaceutically-acceptable acid-addition salts thereof.

References Cited

UNITED STATES PATENTS

| | | | |
|---|---|---|---|
| 3,033,640 | 5/1962 | Hofer et al. | 260—570.7 XR |
| 3,203,992 | 8/1965 | Kunz et al. | 260—570.7 |
| 3,275,629 | 9/1966 | Baizer | 260—570.7 XR |

FOREIGN PATENTS 622,297  4/1949  Great Britain.

OTHER REFERENCES

Beasley et al., "J. Pharm. and Pharmacol.," Vol. 10, pp. 47–59 (1958).

Boyd, "Chemical Abstracts," vol. 5, p. 78 (1911).

Boyd et al., "Chemical Abstracts," vol. 4, p. 1020 (1910).

Brenans, "Chemical Abstracts," vol. 7, pp. 3117–8 (1913).

Fourneau et al., "Chemical Abstracts," vol. 26, p. 1592 (1932).

Ing et al., "J. Pharm. and Pharmacol.," vol. 4, pp. 21–6 (1952).

Lunsford et al., "Journal American Chem. Soc.," vol. 82, pp. 1166–71 (1960).

Petrow et al., "J. Pharm. and Pharmacol.," vol. 8, pp. 666–75 (1956).

Yale et al., "Journal American Chem. Soc.," vol. 72, pp. 3710–16 (1950).

Beasley et al., "J. Pharm. and Pharmacol.," vol. 10, pp. 47–59 (1958).

ROBERT V. HINES, Primary Examiner

U.S. Cl. X.R.

260—477, 490, 521, 516, 609, 612, 326, 566, 590, 501.19, 348, 348.6, 570.5, 404, 584, 570.9, 571, 570.8, 563, 619, 621, 623, 591, 599, 600, 268, 298, 567.5, 570.7; 424— 250, 269, 330